United States Patent [19]

Welch

[11] Patent Number: 5,568,026

[45] Date of Patent: Oct. 22, 1996

[54] SYNCHRONIZING WINDSHIELD WIPERS

[75] Inventor: David W. Welch, Columbus, Miss.

[73] Assignee: United Technologies Motor Systems, Inc., Columbus, Miss.

[21] Appl. No.: 407,838

[22] Filed: Mar. 7, 1995

[51] Int. Cl.$^6$ ............................... B60S 1/08; H02P 5/52
[52] U.S. Cl. ............................. 318/443; 318/41; 318/62; 318/85; 318/DIG. 2
[58] Field of Search .................................. 318/34, 35, 37, 318/41, 43, 49, 53–64, 85, 86, 90, 101, 111, 112, 364, 365, 375, 379, 380, 443, 444, DIG. 2

[56] References Cited

U.S. PATENT DOCUMENTS

| | | | |
|---|---|---|---|
| 4,431,954 | 2/1984 | Carpenter et al. | 318/443 |
| 4,585,980 | 4/1986 | Gille et al. | 318/444 |
| 4,665,488 | 5/1987 | Graham et al. | 318/444 X |
| 4,670,695 | 6/1987 | Licata et al. | 318/443 |
| 5,216,340 | 6/1993 | Welch | 318/443 |
| 5,252,897 | 10/1993 | Porter et al. | 318/443 |

*Primary Examiner*—Bentsu Ro
*Attorney, Agent, or Firm*—Robert E. Greenstein

[57] ABSTRACT

Two windshield wiper blades are powered by separate electric motors. The blades overlap and when one blade is at its reversal point the other blade leaves part as the other blade begins to return to park. The position of the blades is encoded. The blades, if synchronized should be at identical locations and position codes at the same time. Motor power to the blade that arrives first is be removed, allowing the blade to coast. If the other blade still does not arrive at the position after an elapsed time, the first to arrive blade is dynamically braked. Intermittent wiper operation is provided in a way that initiates an immediate wipe if wiper delay is changed while the blades are parked.

11 Claims, 12 Drawing Sheets

SYNCHRONIZING WINDSHIELD WIPERS

TECHNICAL FIELD

This invention relates to windshield wiper controls, in particular, techniques for synchronizing two windshield wipers, each powered by a dedicated electric motor.

BACKGROUND OF THE INVENTION

Ever increasing sophistication of vehicles, from cars to trucks, leaves less space available in the dashboard-firewall area, the typical location for windshield wiper mechanisms. Traditionally, those mechanisms use one electric motor to rotate a gear containing a crank pin connected to each windshield wiper blade so that as the pin rotates the wipers sweep back and forth. Each blade may be connected to a rocker arm so that the blade orientation on the arm changes as the blade sweeps the windshield, increasing the cleared area.

Multi-speed wiper systems have been in use for some time; so too, intermittent wiper systems that have a variable delay by which the blades do not sweep continuously but temporarily stop at or near their parked position, near the bottom of the windshield.

Not surprising, the mechanical arm that links to the blades and the motor takes up space, often substantial, under the dashboard. Moreover, the area near this moving arm must be kept clear of wires and the like. Servicing this type of wiper system is difficult, as well, by reason of limited space under the dashboard.

Some wiper systems use separate electric motors for each blade, an arrangement that obviously releases space in the dashboard-firewall area. However, synchronizing the motors can be a problem, something addressed in U.S. Pat. No. 5,216,340, assigned to the assignee of this application.

Special synchronization problems arise when efforts are made to optimize the clearing performance by the wipers. When the wipers are not in use, they should be parked in a location that does not obstruct the driver's view. When the wipers are operating, as much of the windshield as possible should be cleared, especially the windshield in front of the driver. To optimize the cleared area, so-called "pantograph" arms and blades are used. This permits the blades to move transversely along the windshield, instead of in a generally radially, yet park vertically in the middle of the windshield or at its outboard ends. As a practical matter, this means that the blades must overlap considerably when parked.

Complicating the blade synchronization process, besides variations in motor speed, snow and ice can impede the movement of the blades unevenly, causing one blade to move faster than the other. The blades, if too unsynchronized may clash, especially when blade overlap is high.

DISCLOSURE OF THE INVENTION

An object of the present invention is to provide an electric windshield wiper system in which each blade is powered by its own electric motor, the blades can sweep at different speeds or with a variable intermittent delay wipe and blades have a substantial overlap in the center of the windshield.

According to the present invention, two windshield wipers are separately powered by an electric motor controlled by a programmed controller. For each blade, the controller receives encoded signals that indicate the location of the blade in a specific region that defines a range of blade locations, such as "park to clear", "clear to reversal". When parked, the driver's blade is parked over the passenger's blade. When the wipers are started from their "parked" location, the driver's blade first sweeps across the "clear" region to its furthest location (the "reversal" point). The controller, sensing that, starts the passenger's blade, which moves in the opposite direction. As the passenger blades moves towards its reversal region, it reaches an intermediate location, as does the returning driver's side blade. The controller determines which blade is leading from the time delay between the blades reaching the same point in their respective wipe patterns. If the delays exceeds a stored elapsed time, the leading blade is allowed to coast; that is power to the leading blade's motor is removed. When the lagging blade catches up by entering the same region, the power is restored to the leading blade's motor. But, if the lagging blade has not entered the corresponding region in its wipe pattern at the end of a stored coast period, the leading motor is dynamically braked.

According to the invention, the sweep pattern for both blades is divided into the identical, defined locations and the delay between the blades in reaching those locations is used to determine the leading blade and the duration of coasting and the inception of dynamic braking. As a result of that, and because of the combination of dynamic braking and coast, the blades are synchronized throughout the wipe cycle, the leading blade will be stopped before it reaches a position at which it can interfere with the lagging blade.

According to the present invention, the controller provides signals to a current driver which applies power through a relay to the motor. Depending upon the state of the relay, the power is applied either the high speed or low speed terminals of the motor. The relay's state is set by the speed selected by the driver. A switch, activated by the controller to produce dynamic braking, connects the motor terminal to ground when dynamic braking is dictated by the microcontroller.

According to the present invention, blade position is encoded by using a contact plate, rotated by the wiper motor, to open and close a plurality of circuit paths. The contact plate contains conductive and non-conductive regions that are associated with different wiper sweep regions. As the plate rotates, a code, supplied to the controller, changes, indicating which region, in the full wiper cycle, the blade has entered. For a specific region, the codes for the two motor are inverted or opposite. However, the driver blade is one half of a wipe cycle a head of the passenger blade and the codes for synchronization are therefore the same. An advantage from this is that, as the encoder contacts wear, the consequent changes in blade dwell time in a region is the same for both blades.

According to the invention, during intermittent wiper operation, the blades begin an immediate wipe if the operator shortens the wiper delay while the blades are in the parked position.

According to one aspect of the invention, the driver and passenger motors have identical encoders that produce digital signals indicating discrete wipe regions. When the motors are installed, they are operated, until they both produce a code associated with the blade park region. At that time, the blade arms are installed in the park position.

A feature of the invention is that it can be used to synchronize blades that park in the bottom center of the windshield in a horizontal position or blades that park vertically along a center divider in a two piece windshield, a type found on some trucks and where proper synchronization can optimize snow removal around the center divider, especially to minimize the effects on the movement each blade from snow accumulation in the center of the windshield.

Other objects, as well as benefits and features, of the invention will be apparent from the following discussion of one or more embodiments.

BEST MODE FOR CARRYING OUT THE INVENTION

Figure 1A:
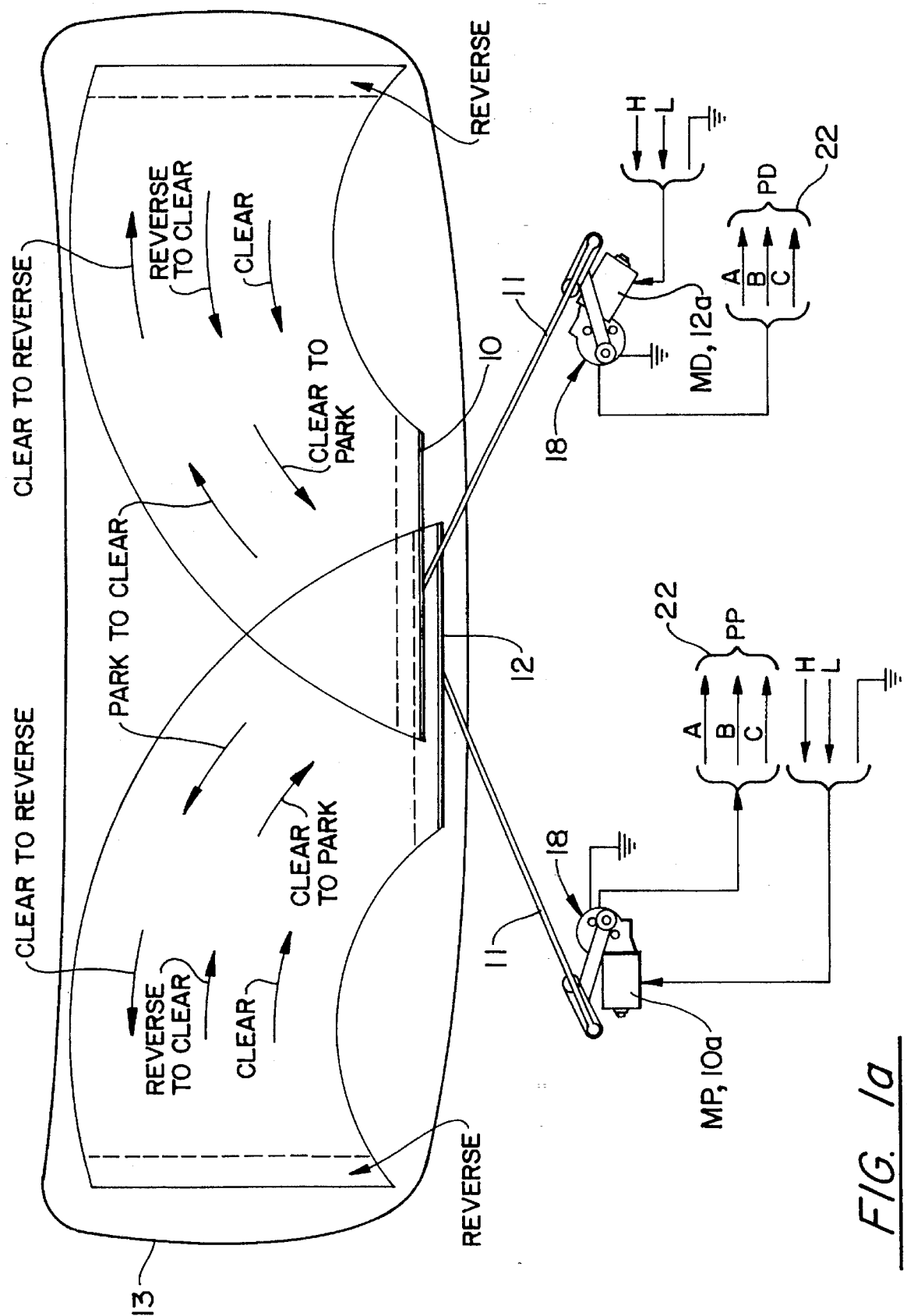
FIGS. 1a–1b is a block diagram of a dual wiper system embodying the present invention.
Figure 1B:
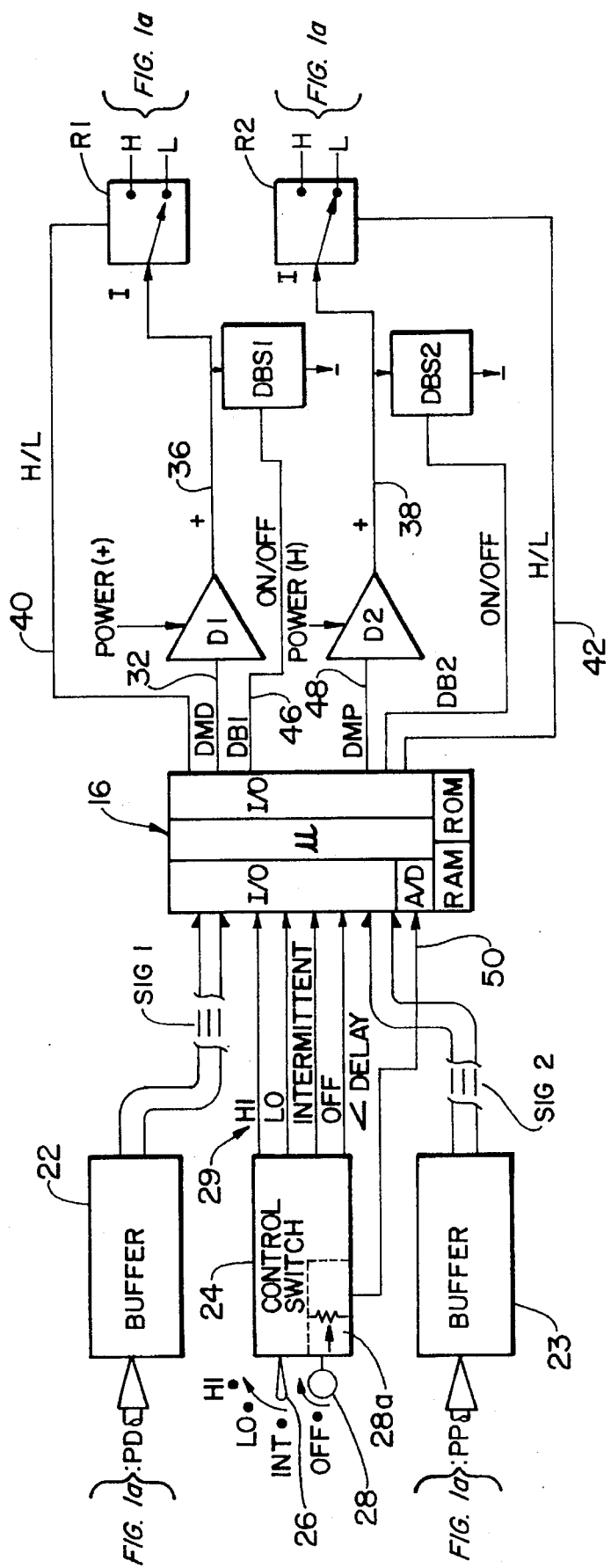

In FIGS. 1a–1b, two windshield wiper blades 10, 12 mounted on arms 11 are seen from the front of a vehicle (not shown). The blades transit wipe regions on a windshield 13, their operation controlled by a microcontroller 16 that synchronizes their movement since they are independently controlled by electric motors 10a, 12a. Both blades are normally parked in the center of the windshield. For instance, blade 10, on the driver's side, is initially parked above the passenger side blade 12 and, when turned on, moves to the right passing through a "park to clear region", then a "clear to reversal zone" and then to a "reversal" region. Microcontroller blades synchronization sequences will be described in greater detail below, but for the moment, it should be realized that when the blade 10 reaches the reversal region, the passenger's side blade 12 moves to the left, from the parked position into the "park to clear region", then the "clear to reversal zone" and then to its reversal region. When the passenger's side blade 12 enters the "park to clear zone", the driver's side blade 10 is returning from the reverse region. If both blades 10, 12 are perfectly synchronized, the passenger's side 12 blades enters its reversal region just as the driver's side blade 10 re-enters the park region. When the blades park, the passenger side blade parks first.

Each blade is propelled by its own electric motor MD (driver side) and MP (passenger side). The drive arrangement is conventional: the motor rotates a gear in a housing (see FIG. 5) and this rocks a crank pin 19 which sweeps the blades across the windshield. The gear is not per se shown, but it rotates an encoder plate 20, shown in FIGS. 5 and 6, described below in more detail. The mechanism to rock the pin 19 may be outside the case, of course, as it is in many vehicles. A full gear rotation produces a full wiper cycle. That cycle is resolved into the regions and corresponding angular displacements for a full encoder plate rotation, shown in FIG. 2, where the park and reverse zones define 20 degrees of gear rotation. It will be explained in more detail below that the encoder plate 20 defines those zones, and three contacts 51 are connected to ground through the plate by a fourth contact 51 a in different combinations as the gear rotates, producing the n-bit words (A,,B, C) that define the passenger blade and driver blade positions as signals PP and PD. Those signals are shown in FIG. 1 a as originating from the gear. There it will be noted that each motor has three inputs, one for high speed (H), one for low speed (L) and one for the ground return from the motor. Following conventional teach the H and L inputs connect to different motor brushes that produce different motor speeds.

Turning to FIG. 1b, two buffers 22, 23 receive the signals PD and PP. A control switch 24, contains a handle 26 for selecting intermittent wipe INT, low speed continuous wipe LOW and high speed continuous wipe HIGH. In the intermittent wipe mode, the blades return to park for a delay time before restarting. A knob 28 is rotated to vary a potentiometer 28a setting that defines the delay interval (Delay). The buffers 22, 23 provide a low voltage conversion of PD and PP to the input/output port of the microcontroller MC as the signals SIG. 1 and SIG. 2. The control switch 24 provides to the microcontroller over lines 29 four signals indicating the selected speed or intermittent operation or that the wipers are off. The delay time is indicated by a signal DELAY on the line 50. As observed previously, PD and PP are three bit binary words that define the location of each blade relative to the gear position according to the table in FIG. 2. The microcontroller contains RAM and ROM for storing the parameters and operating code for synchronizing the two blades following sequences that will be described below and that are generally shown in the flow charts.

In FIG. 1b, it will be seen that the microcontroller MC supplies over lines 32, 34 individual drive signals DMD and DMP to the separate motor drives D1 and D2. In response to the drive signals DMD, DMP the drives D1 and D2 supply POWER+ to relays R1 and R2 over the lines 36, 38. Each relay has two positions. In the normally closed position, which is shown, POWER+ is applied to the low speed L terminal on the motor. The relay state is controlled by a HIGH/LOW signals supplied from the microcontroller on lines 40, 42. When the H/L signal is high, each relay changes state, connecting lines 36, 38 to the high speed motor terminal. In this way, wiper speed or repetition rate is changed. The microcontroller MC also produces separate dynamic brake signals DB1 and DB2 on the lines 46, 48 while turning off the drive signals DMP and DMD. The dynamic brake signals DB1 and DB2 have ON/OFF states. These signals are applied to dynamic brake switches DBS1, DBS2, which connect the lines 36, 38 to ground, thereby connecting to ground the motor winding connected to the input I of each relay R1, R2. A particularly desirable circuit for switches DBS1 and DBS2 is a power MOSFET, but other switches can be employed.. When switches DBS1 and DBS2 are activated, the back EMF induced current from each electric motor flows to ground, which induces motor torque that opposes motor rotation, significantly increasing motor deceleration.

The analog DELAY signal on the line 50, from the potentiometer 28a, is applied to an internal A–D converter, producing a digital value indicating the delay time that the microcontroller uses, when the switch 26 is in the I position, to pulse the DMD and DMP signals, which are fully ON when the switch 26 is in the L and H positions except when they are temporarily turned off during the motor synchronization process embraced by the invention.

Figure 5:
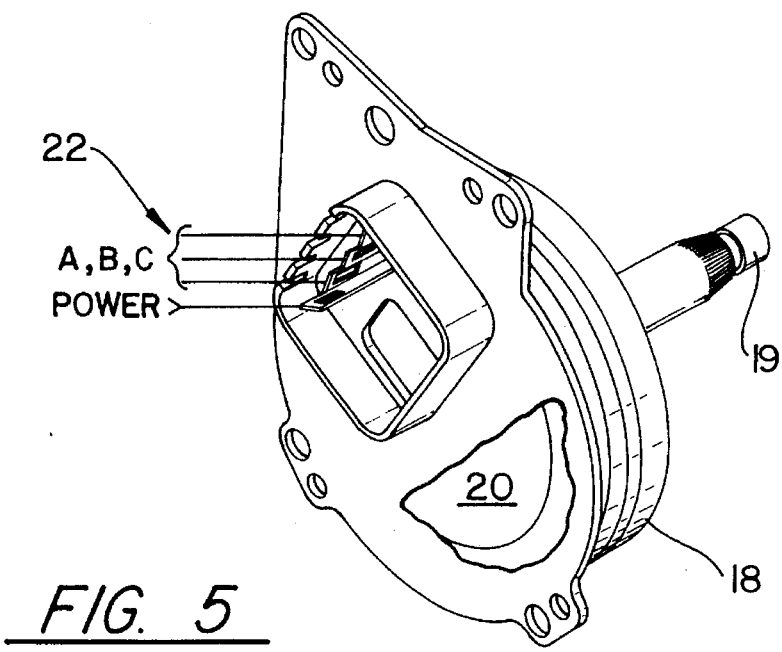
FIG. 5 is a perspective of a blade drive gear housing with electrical terminals for providing a signal indicating gear position.
Figure 6:
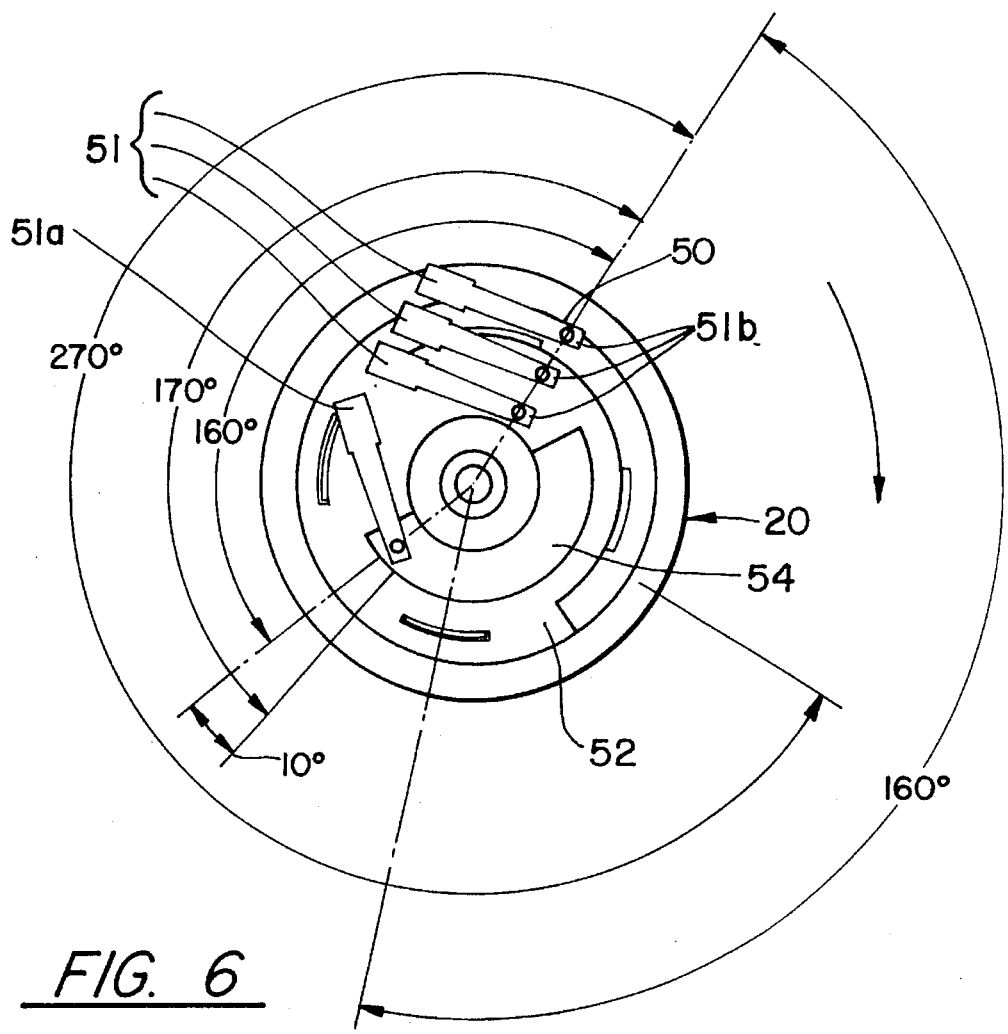
FIG. 6 is plan of a circular contact plate that is contained in the gear housing.

Referring to FIGS. 5 and 6, each motor gear housing 18 contains four terminals that supply the PD or PP signals.

Figure 2:
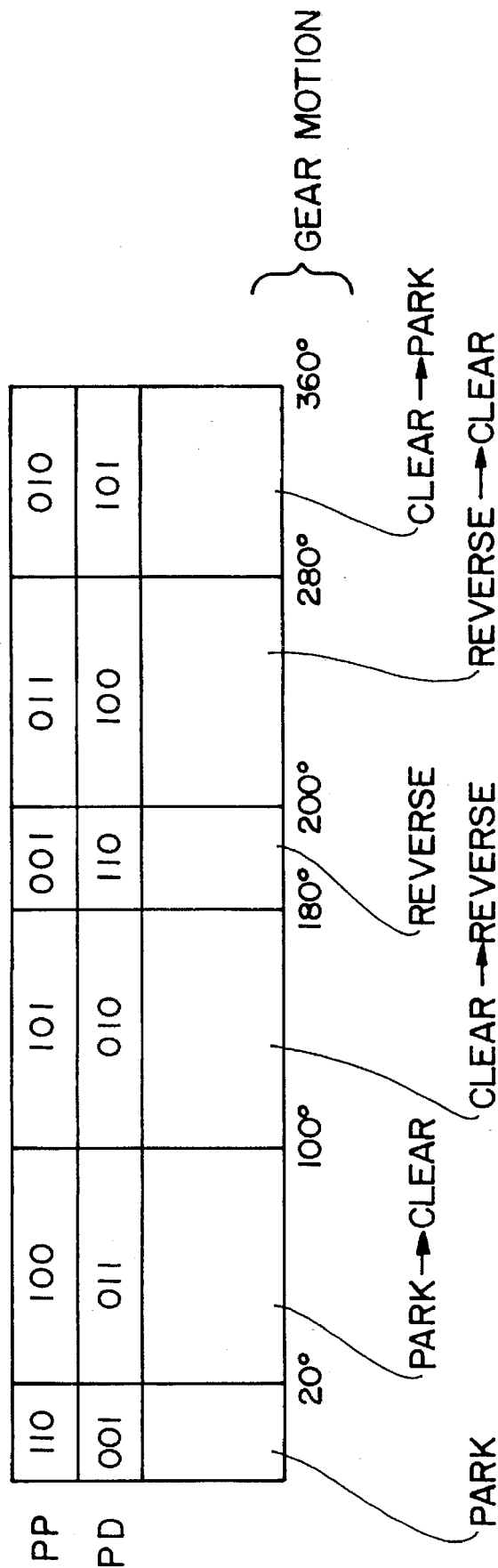
FIG. 2 is a table show codes for different wiper locations.
Figure 3:
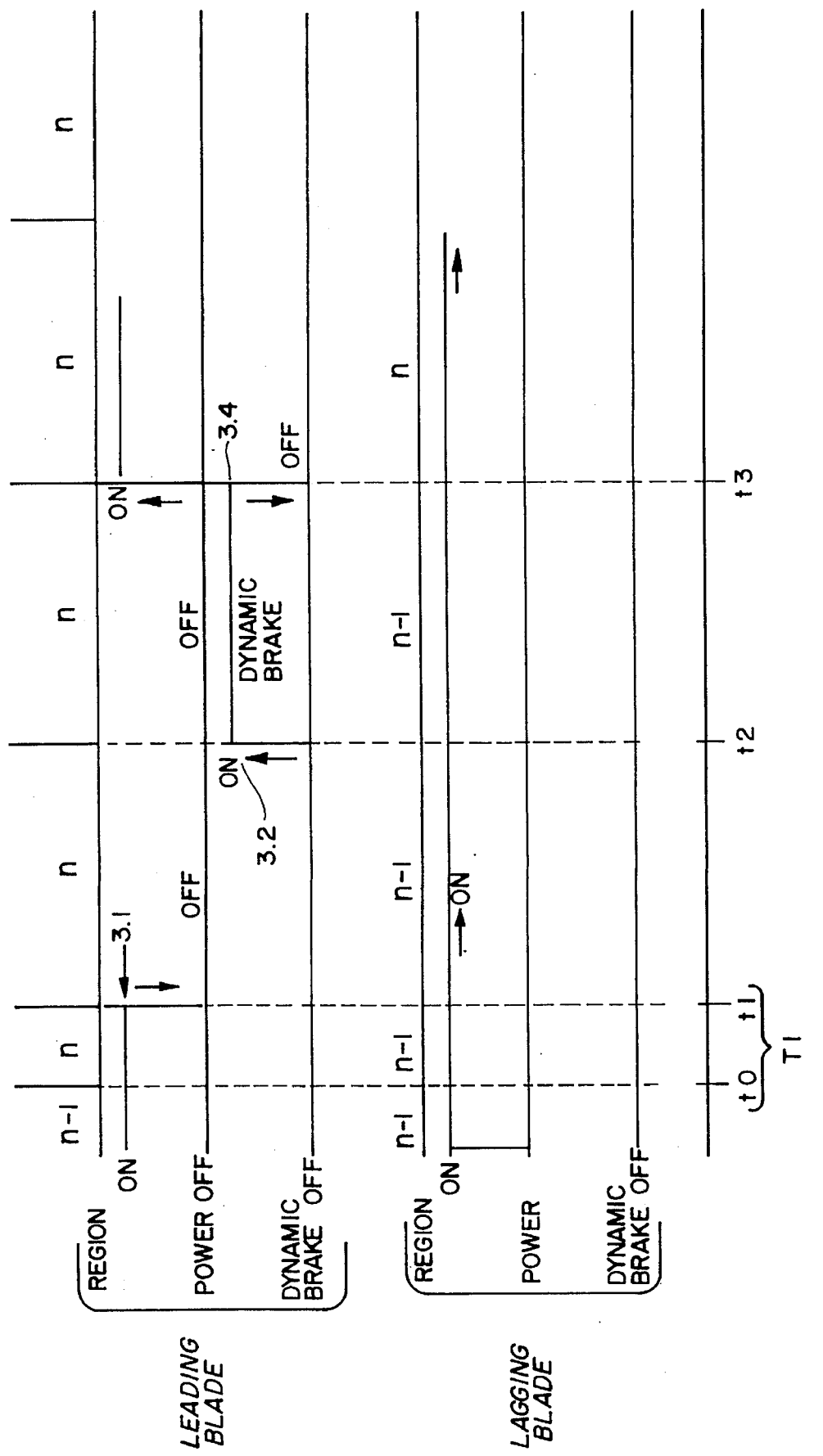
FIG. 3 is a timing chart showing wiper synchronization using "coast" and "dynamic braking" sequences according to the present invention.
Figure 4:
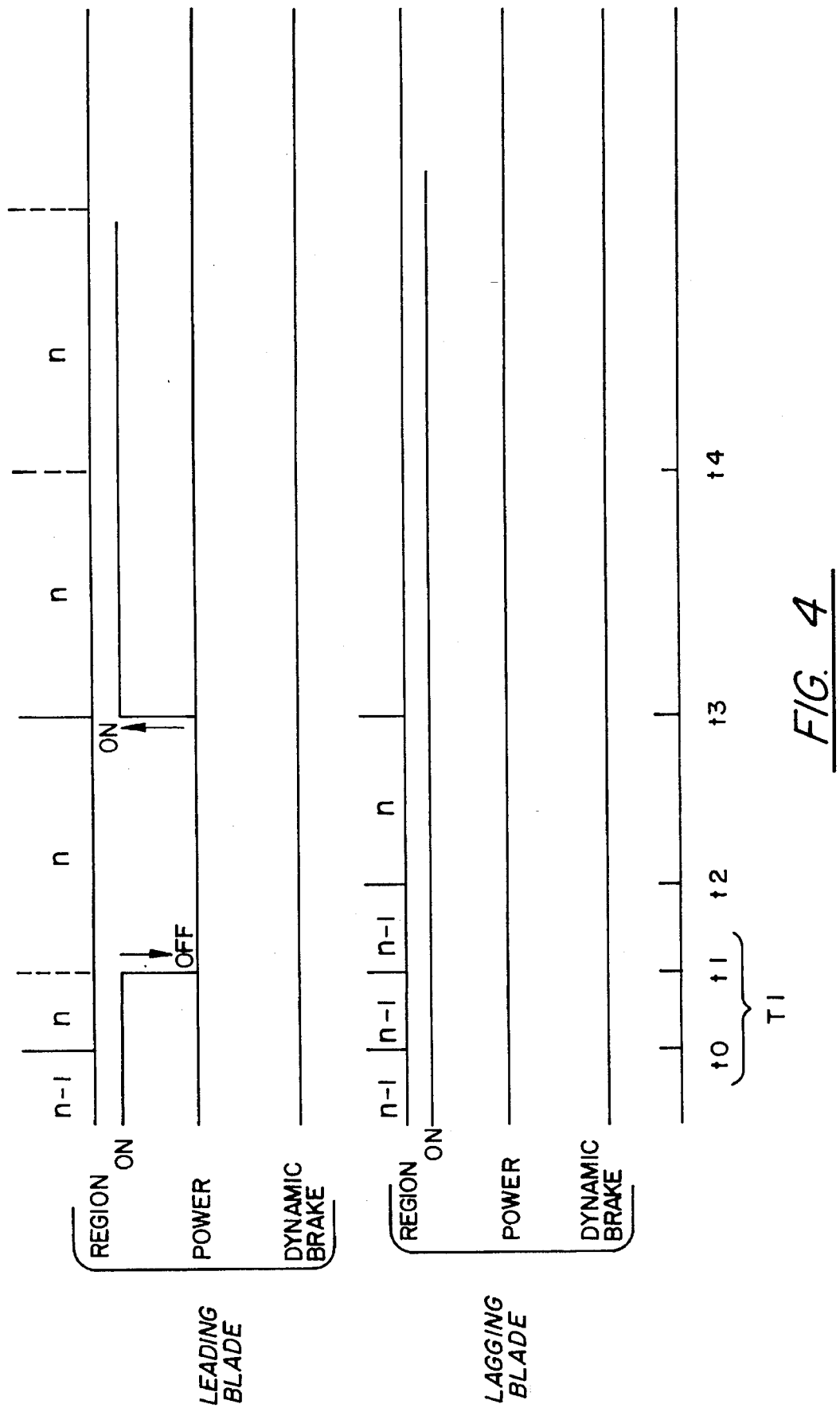
FIG. 4 is timing chart showing wiper synchronization using just the "coast" sequence according to the present invention.

These terminals are connected to sliding contacts 51 that make contact with plate 52, having conductive paths or cut-outs 54 so arranged relative to each other to define the positions shown in FIG. 2. The state of three of these terminals, either high or low, defines the binary value of the PD and PP signals. The fourth sliding contact 51a provides ground to the plate. The terminals are connected to a power supply through a pull-up resistor (non shown) in the buffers 22, 23. As the plate 52 rotates, the contact 51a completes the connection with one or more of the other contacts 51 through the pull-up resistor, producing a state change at the buffer (at a pull-up resistor, non shown, in the buffer) that appears as the three bit code PP and PD in FIG. 2.

Previously, it was explained that the microcontroller reads the binary values for signals PD and PP to determine the time delay, if any, between zones for each motor MD and MP. Ideally, the codes for PP and PD should be produced in synchronism, but in reality they are not, and the microcontroller regulates the on time for DMD and DMP and activates dynamic braking to synchronize the motors. At any time, one motor may be the "leading" motor because it has produced the region identifying code before the other motor. For instance, if MD is slightly faster that MP, the PD signal for park-clear, binary 011, will be produced before PP signal for clear to park is binary 011. The same binary code is used for both motors to counteract the asynchronization that can result over time from contact wear. To understand this, refer to FIG. 2, which shows the code for both motors, but it should be understood that the blades are 180 degrees out of phase. Using FIG. 6, it can be assumed that the terminal 50 is a nib, but with time it will flatten. Therefore, it makes contact with the conductive path 52 earlier in time and dwell on the conductive path longer. But because the encoders produce the same codes for the synchronization points (when changing regions), the shift in dwell time is the same between the blades and therefore it does not produce blade to blade asynchronization over time.

FIGS. 7a–7e illustrate signal processing steps used to control the two motors according to the present invention. These sequences take place at very high processor speeds as part of a micrcontroller program steps that are stored in the ROM. One skilled in the art of computer programming, of course, can write different programs to carry out instructions to implement the signal processing and control logic expressed by the flow-charts, which embody the invention. The wiper control process starts at step S1 in FIG. 7a, a step that tests the condition of the wiper control switch 26. If it is not OFF, a series of tests, steps S2–S5, are performed to detect the requested wiper operating mode, from OFF or PARK, INTERMITTENT (INT.), LOW speed and HIGH speed. An affirmative answer at any of these tests invokes a subroutine call for a desired wiper operation, which is shown by the separate blocks S2a–S5a, which refer to the expanded sequences set forth in FIGS. 7b, 7c, 7f and 7g. As it can been, certain steps in those routines are the same, such as "motor running", steps S2b, S3b, S4b, S5b. It should also be observed that the step "run motors", for instance step S4f, invokes step S17 in FIG. 7d, an entry point in the sequence that starts with the step "start motors", step S10.

Figure 7A:
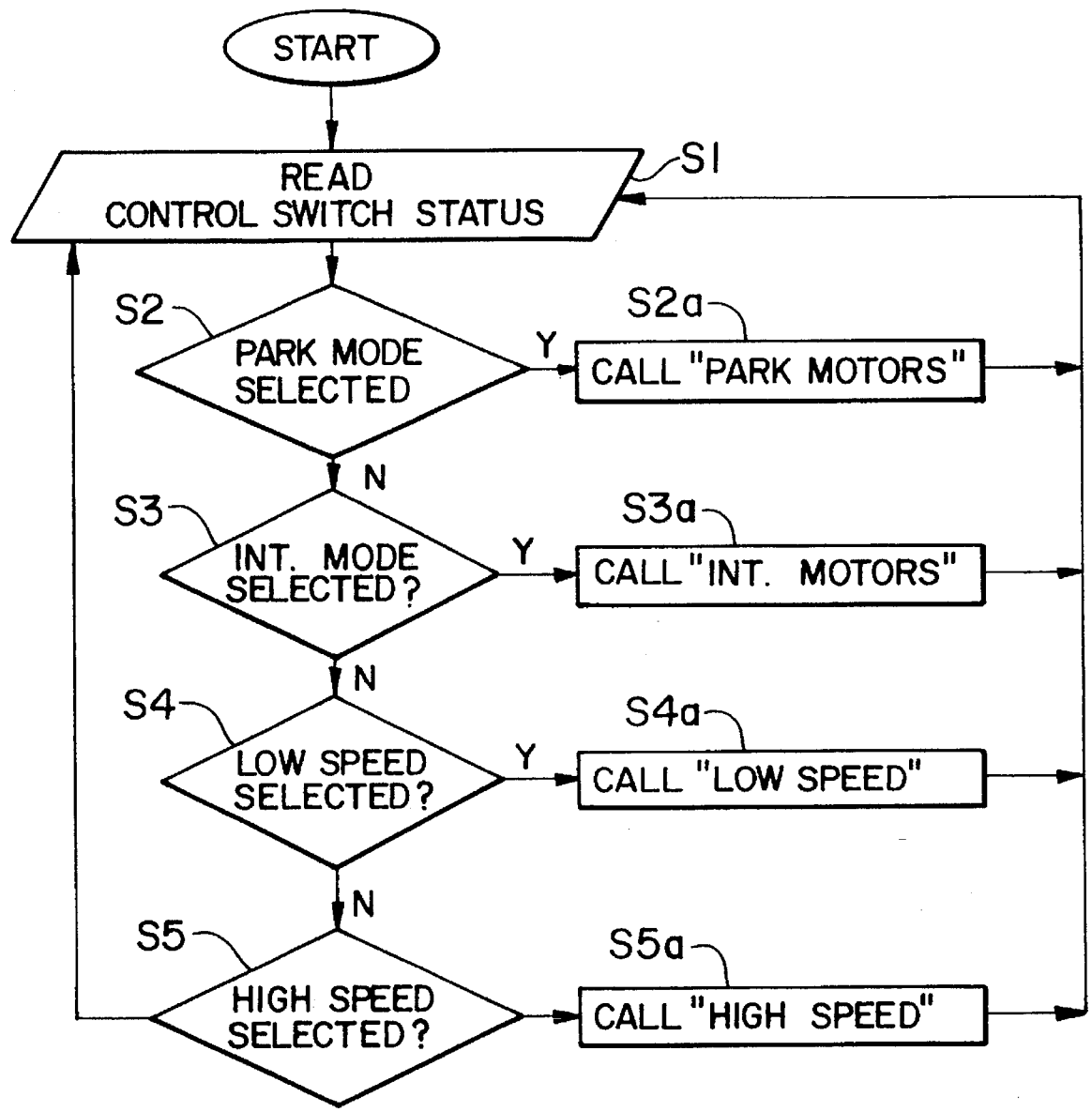
FIGS. 7a–7g are flow-charts showing signal processing sequences for implementing the synchronization steps according to the present invention.
Figure 7C:
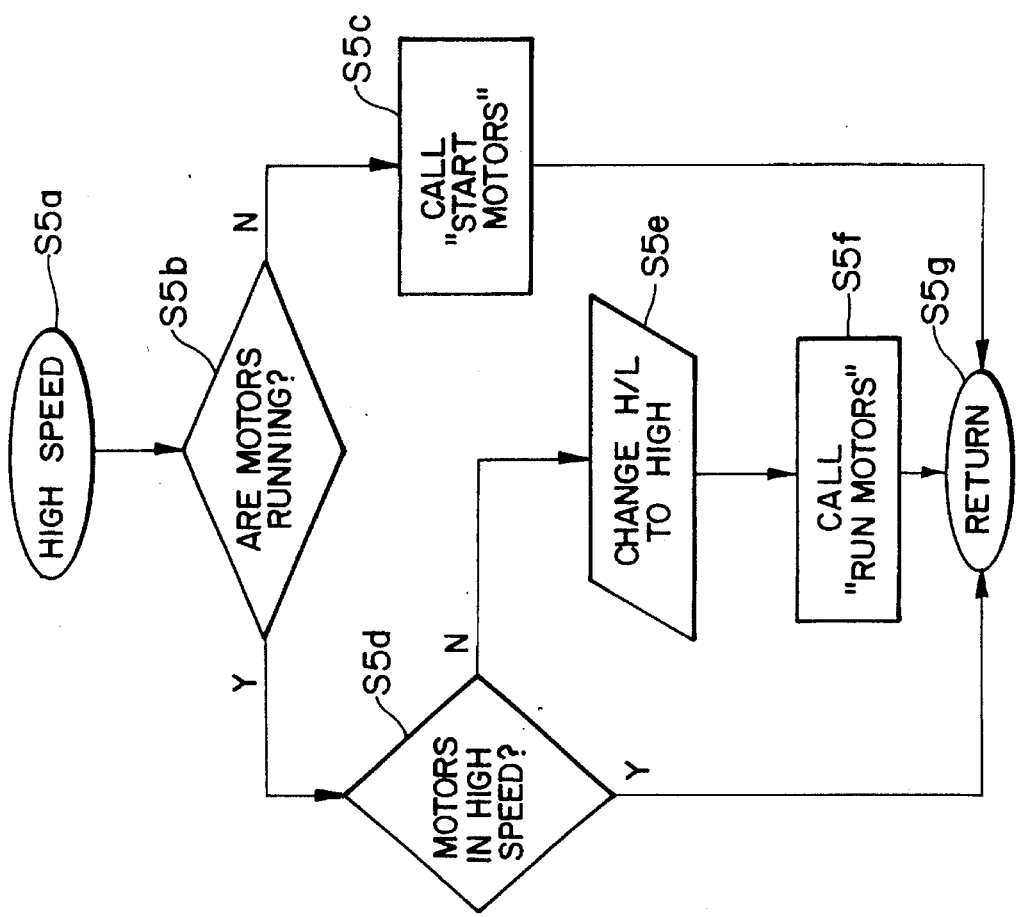
Figure 7B:
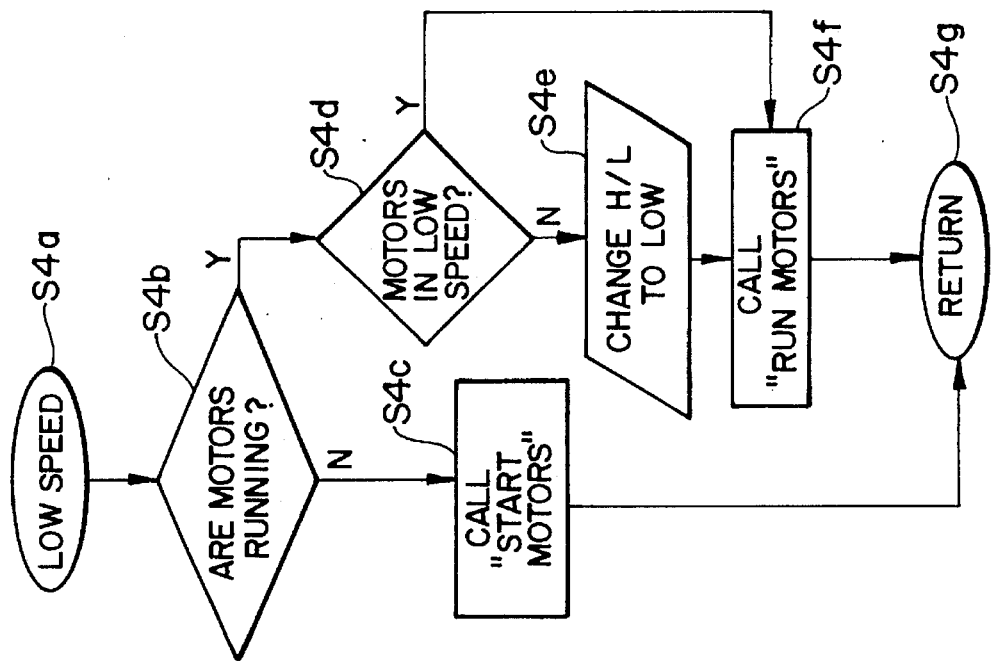

FIGS. 7b and 7c are identical, except that one initiates low speed motor operation and the other high speed operation. Explaining one will explain the other. Assuming low speed operation is detected in step S4, the low speed initialization is started at step S4a. In step S4b, a test is made to determine if the motors are already running. If they are not, step S4c is invoked, leading to step S17 in FIG. 7d, which will be discussed below, but for the moment can be explained as the point at which the driver's side motor MD is activated by the signal DMD. An affirmative answer at step S4b leads to step S4d and a test to find if the motors are already operating at low speed. If not, the speed is changed to low speed in step S4e. Then, in step S4f, the "run motors" step is called, moving the program to step S10 in FIG. 7d. The sequences S5a–S5g follow the same path, but only if high speed is detected in step S5.

Figure 7D:
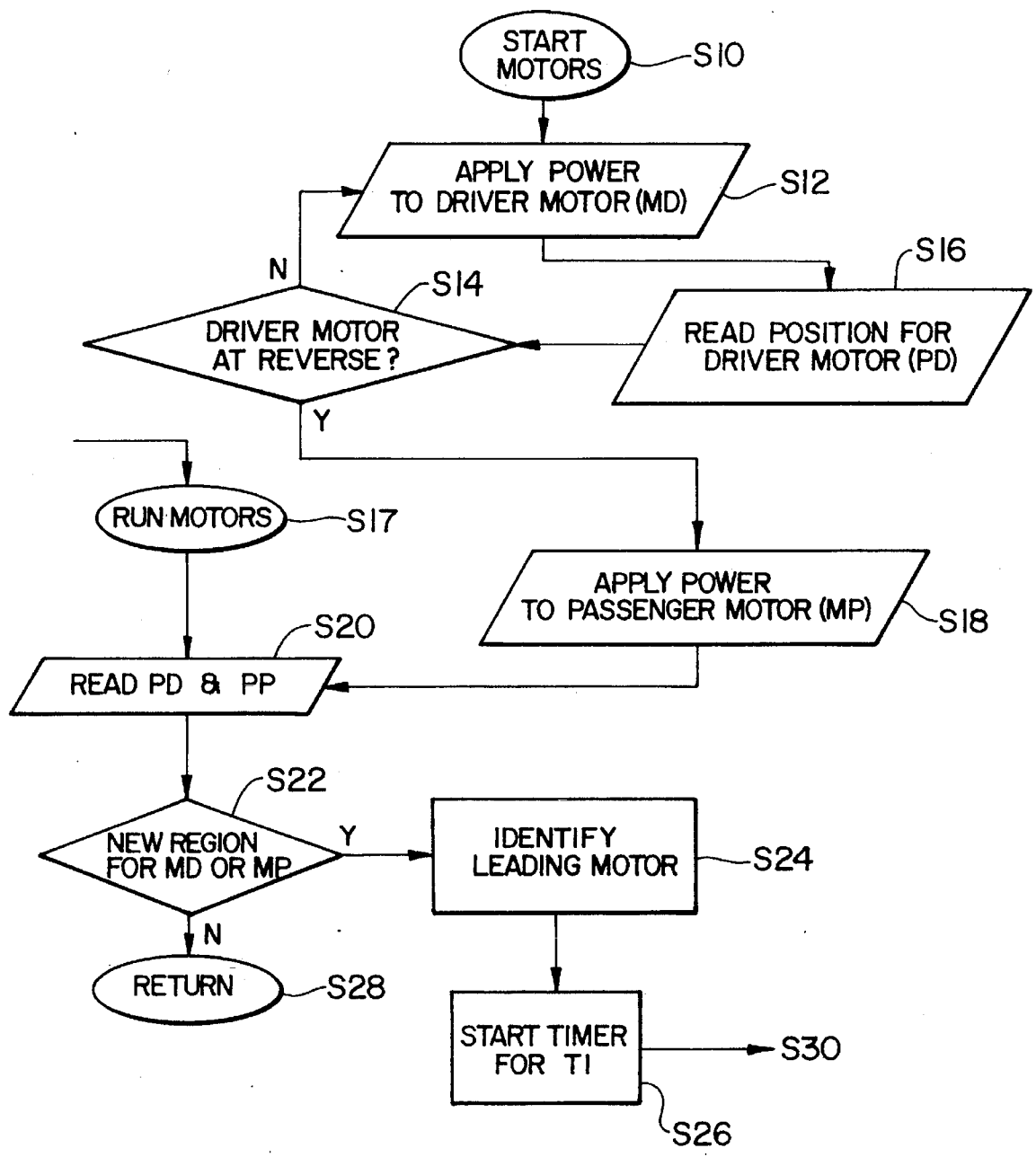
Figure 7E:
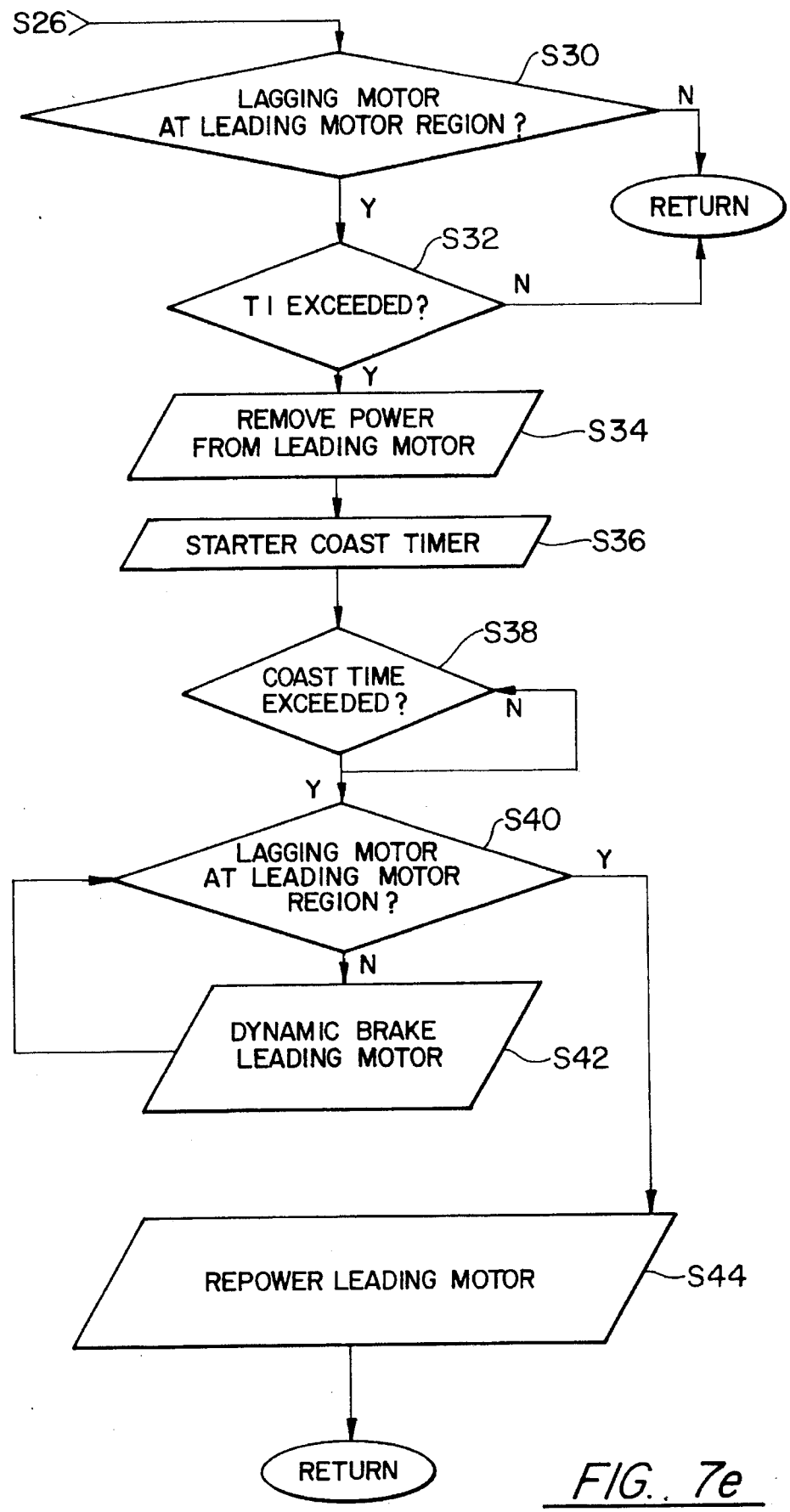
Figure 7F:
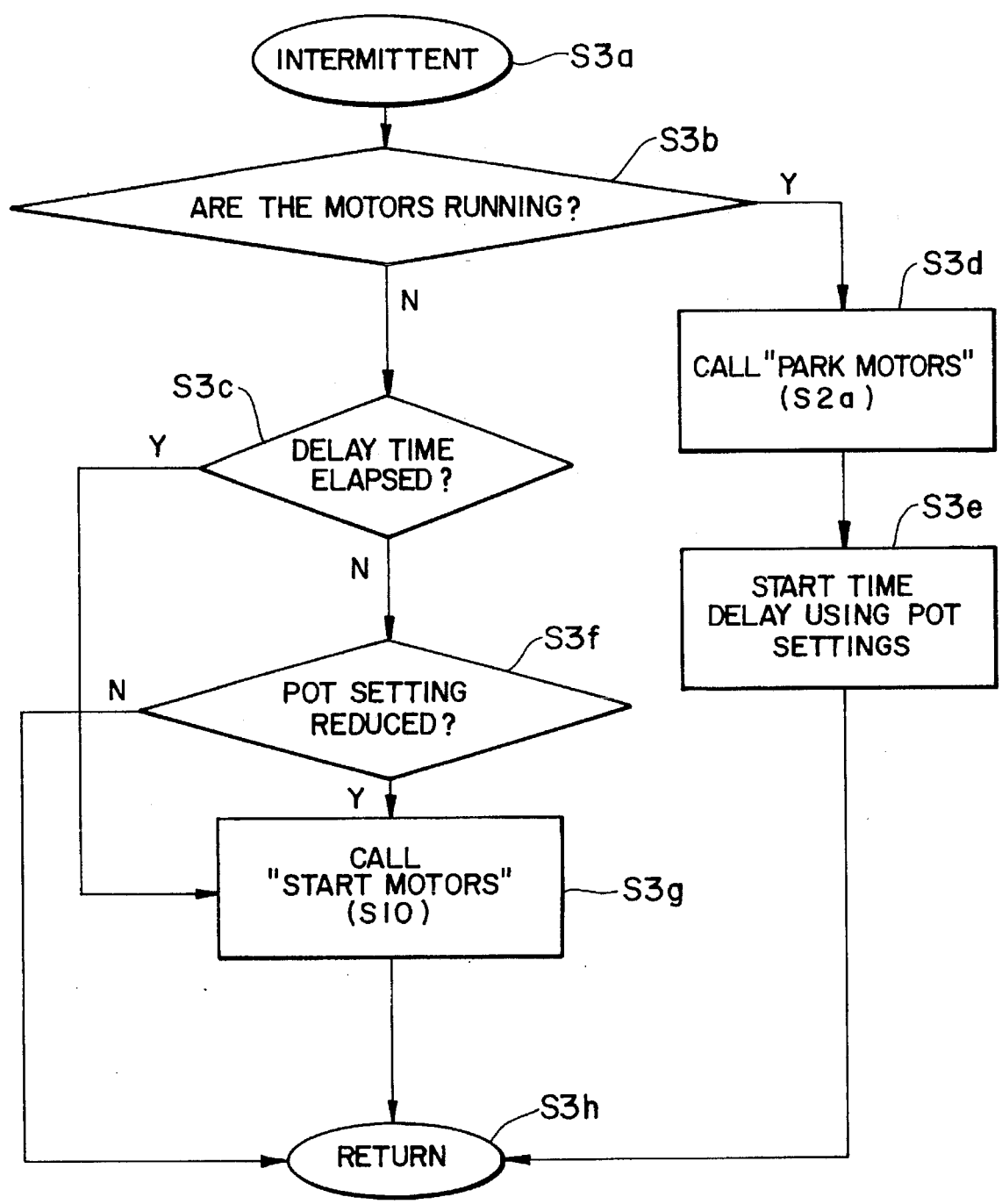

If intermittent operation is detected in step S3, step S3a is called, entering the sequences shown in FIG. 7f. Step 3b, like steps, S4b, S4c, detects if the motors are running. An negative answer leads to step S3c, which detects if the delay time has elapsed. If not, step S3f detects if the operator has reduced the delay time. If so, an affirmative answer, step S3g calls the "start motors" sequence at step S10, which will lead to an immediate wipe with out the delay, after which the shorter delay will be used. A negative answer to step S3f leads to step S3h, allowing the intermittent wipe to continue. If the test at step S3b is affirmative, the "park motors" routine that begins with step S2a is invoked at step S3d and when it is completed, the delay (position of pot 28a) time at the time of parking is retained at step S3e.

Figure 7G:
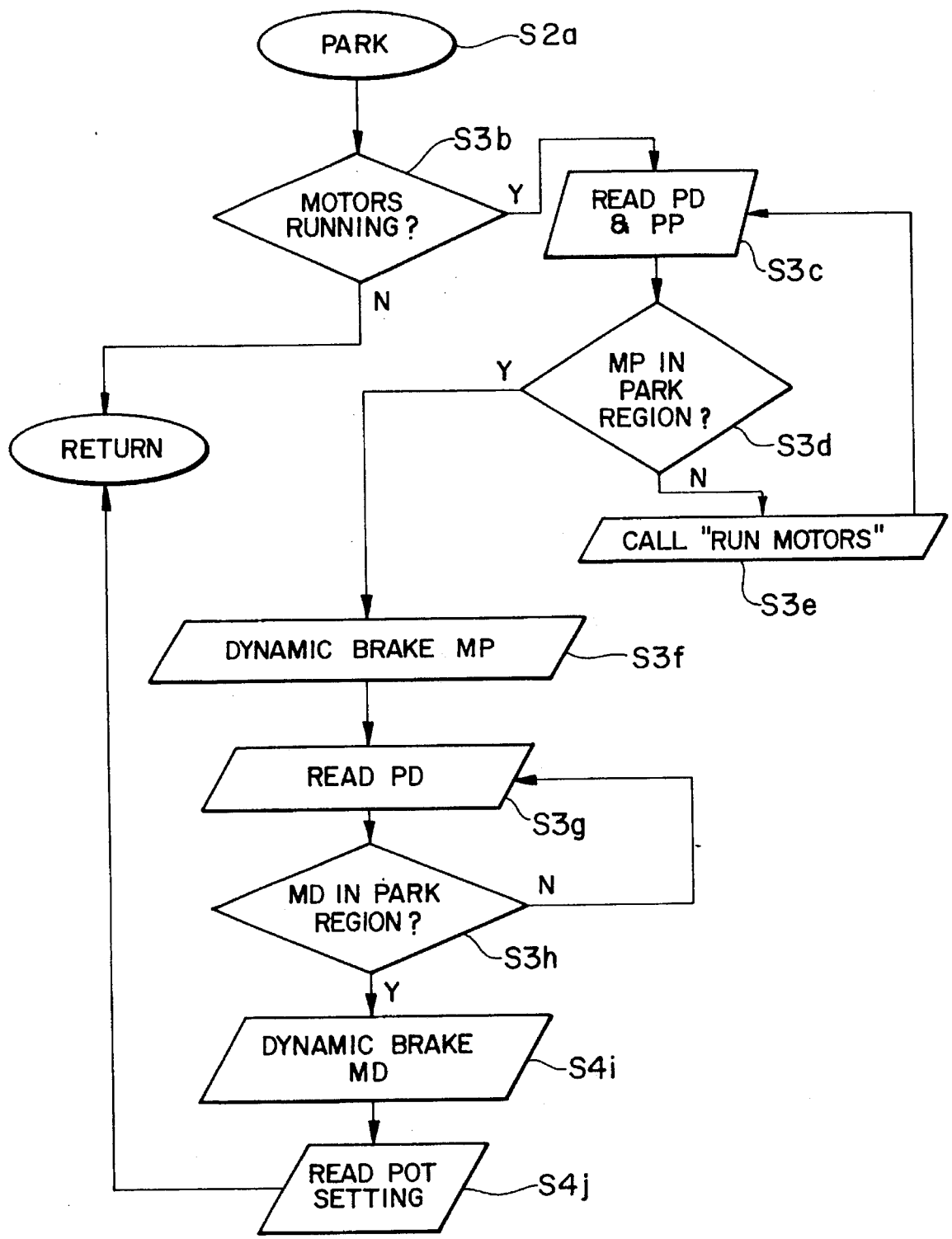

Having discussed speed selection and intermittent operation, the parking sequences will be discussed before describing the sequences for continuous operation. In FIG. 7g, the test to determine if the motors are running is made at step S3b, once the park routine is entered at step S2a. If the motors are running, producing an affirmative answer at step S3b, the blade positions PD and PP are read at step S3c. At step S3d, the "run motors" routine is entered if the passenger blade is not in the park region. If it is, step S3f activates dynamic braking on the passenger's motor MP by activating switch DBS2. Step S3g reads the driver's blade position PD. Step S3h determines if the driver's motor is in the park region. If not, PD is reread until there is an affirmative answer at step S3h, which tells the controller 16 leads to dynamic brake by the driver's motor MD in step S4i. The next step S4j reads the intermittent delay pot 28a setting, so that the delay is retained if intermittent operation is subsequently requested.

In FIG. 7d, step S10 is a command to start the motors. Once again, it should be observed that this step may be called from the previous subroutines. Following step S10, power is applied to the driver's motor MD in step S12. At step S16, the driver's motor position or PD is read. Step S14 is a test to determine if the driver's motor is at its reverse position, code 110 in FIG. 2. If it is not, the test is rerun as the motor operates, until the PD code of 110 is detected. Once the affirmative answer is obtained in step S14, the passenger's motor PD is activated at step S18. Then, in step S20, the values for PD and PP are read. With that data, a test is performed in step S22 to determine if either motor has entered a new region. For instance, the driver's blade may have entered the reverse to clear region, PD there being 100. If the blades are perfectly synchronized PP will also change from 110 to 100, as it moves from the park to park to clear region. But, if neither blade has moved into a new position, the negative answer at step S22 leads to the return. However, subsequently, the sequence in FIG. 7d will be reentered at step S17 and the reading of PD and PP will again be made and the test at step S22 performed. Once one of the blades enters a new region, step S22 will produce an affirmative answer. Step S24 identifies which blade is the leading blade; that is, which blade has entered the new region first. Step S26 sets a timer for a duration T1, which is the sampling window that determines if the synchronization action needs to be taken. Step S26 leads to step S30 in FIG. 7e, which tests to see if the lagging motor has entered the next region. For instance, if the driver's blade is the leading blade and has produced code 100, the test sees if the passenger's blade also produced that code. A negative answer simply causes the test to be rerun until the lagging blade does enter the next region. Step S32 determines if it has entered the next region within time T1. Here, the affirmative answer is important because it causes, at step S34, the leading motor to slow by removing power to the motor by removing the drive signal, i.e., removing signal DMB, if the driver's blade is leading. At this point the leading blade is "coasting". A negative answer at step S32 leads to the return, and, as before, the test at S22 will again be run at subsequent processor cycle interval or an interrupt. Following step S34, a coast timer is started in step S36. Step S38 determines if the coast time has been exceeded. If so, the test at step S40, determines if the lagging motor is in the same region as the leading motor. If the answer is yes, power is restored to the leading motor at step S44. In the previous example, the DMB signal would be restored. If the lagging motor still is not in the same region as the leading motor, dynamic braking is initiated. In the previous example, switch DBS1 would be activated by producing signal DB1. Eventually, the lagging motor enters the same region as the leading motor, producing the needed affirmative answer at step S40 to repower the leading motor, at which time, dynamic braking also is inactivated.

While the best mode for carrying out the invention and possible modifications and variations have been explained, one skilled in the art and with the benefit of that explanation, may be able to modify an embodiment of the invention, in whole or in part, without departing from the true scope and spirit of the invention.

I claim:

1. A windshield wiper system comprising a first wiper blade, a first motor for operating the first wiper blade, a second wiper blade, a second motor for operating the second wiper blade, characterized by:

a first drive for providing operating power to the first motor in response to a first motor drive signal;

a second drive for providing operating power to the second motor in response to a second motor drive signal;

first encoder means for providing a first position signal indicating the position of the first blade;

second encoder means for providing a second position signal indicating the position of the second blade;

signal processing means for providing the first and second motor drive signals; for receiving the first and second position signals; for providing a coast signal if the first blade has reached a first location before the second blade has reacahed a second location; for interrupting the first motor drive signal in response to the coast signal; for providing a dynamic braking signal if the second blade has not reached the first position after a selected elapsed time following the coast signal; and first dynamic braking means responsive to the dynamic braking signal for dynamically braking the first motor.

2. The windshield wiper system described in claim 1, further characterized in that:

the first position signal and the second position signal identify corresponding angular locations in a full wipe cycle for each blade.

3. The windshield wiper system described in claim 2, further characterized in that:

the full wipe cycle is 360 degrees.

4. The windshield wiper system described in claim 1, further characterized in that:

the first and second encoder means each comprise a contract plate that is rotated 360 degrees for each full wipe cycle and means, in communication with the contact plate, for providing an N bit signal that identifies the location of the contact plate at selected angles between 0 and 360 degrees.

5. The windshield wiper system described in claim 1, further characterized in that:

the signal processing means comprises means for the second motor drive signal when the first blade reaches a third position, whereby the second blade first begins to move when the first blade reaches said third position.

6. The windshield wiper system described in claim 1, further characterized in that:

the signal processing means comprises means for delaying the start of the first motor based on a commanded delay and for immediately starting the first motor when the delay time is changed while the first motor is in a parked position.

7. The windshield wiper system described in claim 1, further characterized by:

second dynamic braking means responsive to a dynamic braking signal for dynamically braking the second motor; and the signal processing means comprising means, responsive to the first and second position signals and a blade park signal, for providing the dynamic braking signal to the second dynamic braking means when the second blade reaches a park location; and for subsequently providing the first dynamic braking signal to the first dynamic braking means when the first motor reaches a park position.

8. The windshield wiper system described in claim 1, further characterized by:

a first individual switch for the first and second motors for connecting motor drive power from a switch input to a selected winding on each motor in response to a speed select signal from the signal processing means and a second individual switch for connecting the winding to ground in response to a dynamic brake signal from the signal processing means.

9. The windshield wiper system described in claim 1, further characterized in that:

the signal processing means comprises means for providing the second motor drive signal when the first blade reaches a second position, said second position be a region in which the first blade reverses.

10. The windshield wiper system described in claim 1, further characterized in that:

the first and second position signals identify four regions traversed by the blades.

11. A windshield wiper system comprising first and second wiper blades, each powered by a separate electric motor, characterized by:

a position encoder associated with each blade for providing a signal that indicates the blade position;

signal processing means for receiving said position signals while the first and second blades are moving and synchronizing the motion of the blades by interrupting power to a motor powering the first blade if the second blade is not at the same position as the first blade; dynamically braking said motor if the second blade is not at the same position as the first blade after the power is removed from said motor; and restoring power to said motor when the second blade is at the same position as the first blade, said positions being defined by a code provided by the encoders, the code defining wipe regions.

\* \* \* \* \*